2 Sheets—Sheet 1.

A. H. GERDOM.
Vegetable-Cutter.

No. 197,353.  Patented Nov. 20, 1877.

Attest:
E. E. Court.
August Petersohn.

Inventor:
Anthony H. Gerdom
by C. A. Snow & Co.
Attys.

2 Sheets—Sheet 2.

A. H. GERDOM.
Vegetable-Cutter

No. 197,353.   Patented Nov. 20, 1877.

Attest:
August Petersohn
M. S. Ditmer.

Inventor:
Anthony H. Gerdom
by C. S. Snow & Co.
Attys.

UNITED STATES PATENT OFFICE.

ANTHONY H. GERDOM, OF ALBANY, NEW YORK.

IMPROVEMENT IN VEGETABLE-CUTTERS.

Specification forming part of Letters Patent No. 197,353, dated November 20, 1877; application filed July 20, 1877.

*To all whom it may concern:*

Be it known that I, ANTHONY H. GERDOM, of Albany, in the county of Albany and State of New York, have invented certain new and useful Improvements in Vegetable-Granulators; and I do hereby declare that the following is a full, clear, and exact description thereof, which will enable others skilled in the art to which it appertains to make and use the same, reference being had to the accompanying drawings, which form a part of this specification, and in which—

Figure 2:
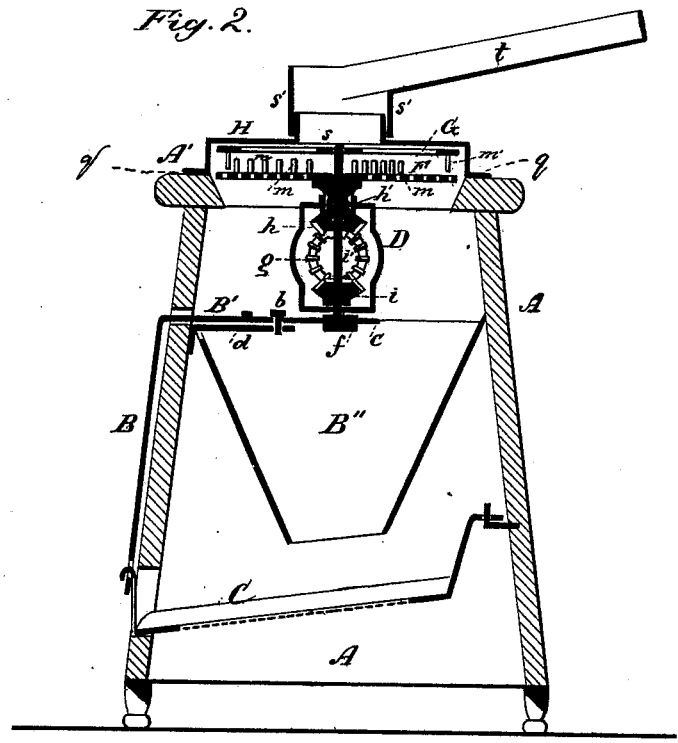
Figure 1:
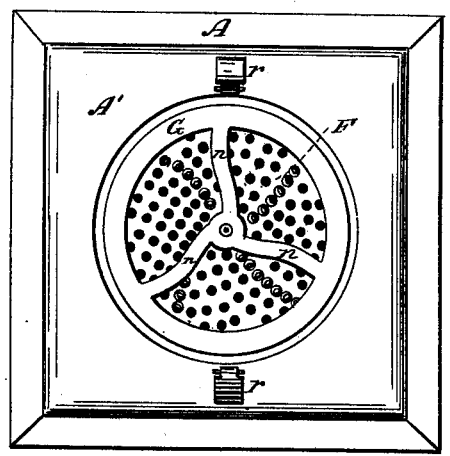
Figure 3:
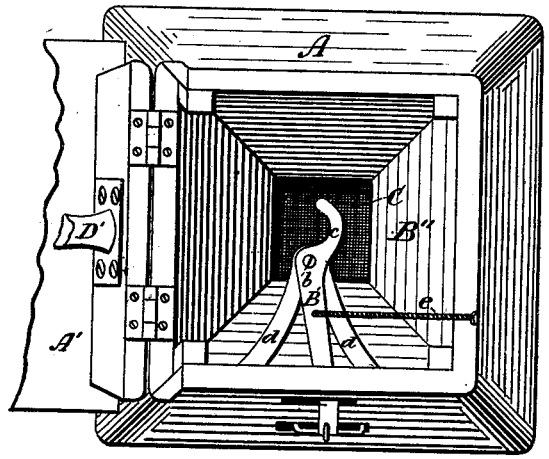
Figure 4:
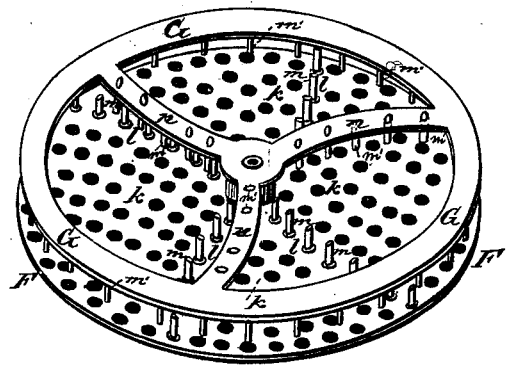
Figure 5:
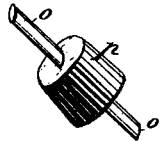

Figure 1 is a top plan, the covering-plate and feed slide or hopper having been removed. Fig. 2 is a vertical section. Fig. 3 is a top view of the machine with the hinged top part open and thrown back. Fig. 4 is a perspective view of the granulating wheels or disks, and Fig. 5 is a perspective view of one of the granulators or cutters for disintegrating the vegetables detached from the machine.

Similar letters indicate corresponding parts in all the figures.

My invention relates to machines for disintegrating or granulating roots and vegetables; and it consists in the construction and combination of parts, whereby a simple, durable, and efficient machine is produced, substantially as hereinafter more fully described, and pointed out in the claims.

In the drawing, A is a box, made of wood or metal, having a hinged top or cover, A', held in place, when closed, by a clasp or hook. Within this box is placed a hopper, B'', under the mouth of which is hung an oscillating chute screen or riddle, C. Screen C is operated by a rod, B, which passes (on the outside or inside of box A) up into the upper part of the box above the hopper B'', where it is bent at a right angle, so as to form an arm, B', which terminates in a rounded hook, c. Arm B' is pivoted at b in the end of a short bracket, d, which projects from the inside of the box, and has a pull-spring, e, affixed, the other end of which is secured on the inner side of box A, as shown in Fig. 3. A reciprocating motion is imparted to the hooked arm B' by a cam, f, to be hereinafter described. D is a closed metal box, secured upon a hollow bracket, D', which projects inwardly from the hinged upper part of the box. Within this box are the bevel-wheel g and pinions h i, rotated in opposite directions by wheel g, the axle of which passes through the tubular bracket D', and is operated by a crank. Shaft h' of pinion h is also hollow, to admit of the passage through it of shaft i' of pinion i, which projects through this pinion and down through the box D, where it has secured upon its outer end the cam f, which, when the machine is operated, imparts an oscillating motion to the arm B', rod B, and chute-screen C. To the top of the vertical tubular shaft h' is keyed an annular disk, F, and to the top of shaft i' is keyed the hub or center of a horizontal wheel, G, parallel to the disk F. It follows that when the operating-crank is turned, disk F and wheel G will rotate in opposite directions, or against each other. The former has four sections of perforations, k, divided by solid curved arms l, into which are fitted the cutters m. Wheel G has three curved arms, n n n, each of which, as well as the periphery, is similarly armed with the cutters m'. Cutters m and m' consist each of an oval steel pin, o, secured in the middle of a tapering block, p, of soft metal, so as to project from both sides. They are secured in disk F and wheel G by screw-holes, into which the soft-metal taps p are screwed, thereby forcing the metal into the screw-threads, and keeping the pins or cutters firmly in place with their broad sides parallel to each other. H is a circular metal box or cover, which fits over the wheel G and disk F, on top of box-cover A', and has an annular flange, q, by means of which cover H is fastened upon box-cover A' with the hinged clamps or catch-lugs r r. In the center of cover H is a circular perforation, s, surrounded by a raised rim or flange, over which fits the sleeve s' of the slide t, by which the vegetables to be granulated are fed into the machine.

From the foregoing description, the operation of this apparatus will be readily understood. The roots or vegetables, if too large, are first chopped or sliced into pieces of suitable size, which are fed into the machine through the opening s, when they fall down upon the perforated disk F, which is being rapidly revolved. Here they are met by the cutters m and m', rotating in opposite directions, and, in their rotations, passing closely between each other, thereby thoroughly cutting, tearing, and comminuting the vegetable matter on disk F, which falls through the perforations down into the hopper and out upon the oscillating screen C, the mouth of which projects through a slot in box A, so that a box or pail may be placed under it for the reception of the granulated vegetables.

This machine is simple in its construction, strong, durable, and will do its work quickly and satisfactorily. It may be made in various sizes to suit different kinds of roots or vegetables, or different purposes; and when the cutters become damaged or blunted from wear, they may readily be removed and others inserted in their place, the cost of each cutter (when manufactured on a large scale) being merely nominal.

Having thus described my invention, I claim and desire to secure by Letters Patent of the United States—

1. As an improvement in vegetable comminutors or granulators, the combination of a horizontal rotating wheel, G, armed with vertical cutters $m'$, with the horizontal disk F, rotating in the opposite direction, and having perforated sections $k$, divided by the radial arms $l$, having vertical cutters $m$, substantially as and for the purpose herein shown and specified.

2. As an improvement in vegetable comminutors or granulators, the cutters $m\ m'$, consisting each of a sharp-edged pin or knife, $o$, embedded in the center of a taper soft-metal tap, $p$, substantially as and for the purpose herein shown and described.

3. The improved vegetable comminutor or granulator herein described, consisting of the box A, having oscillating chute screen or riddle C, bent rod B B', and hopper B'', in combination with the hinged top part A', having box D, containing the operating mechanism, cutter-disks F G, rotating in opposite directions, cover H, and feed-slide $t$, all constructed and combined to operate substantially in the manner and for the purpose hereinbefore set forth.

In testimony that I claim the foregoing as my own I have hereto affixed my signature in presence of two witnesses.

ANTHONY H. GERDOM.

Witnesses:
GREG. GERDOM,
J. J. GALLUP.